United States Patent

Patel et al.

[11] Patent Number: 5,559,686
[45] Date of Patent: Sep. 24, 1996

[54] STEPPED WAVEFORM INVERTER CONTROL

[75] Inventors: Sunil Patel; Chai-Nam Ng; P. John Dhyanchand; Vietson M. Nguyen, all of Rockford; Michael Teagardin, Loves Park, all of Ill.

[73] Assignee: Sundstrand Corporation, Rockford, Ill.

[21] Appl. No.: 273,039

[22] Filed: Jul. 8, 1994

[51] Int. Cl.⁶ .................................................... H02M 1/12
[52] U.S. Cl. ............................................. 363/43; 363/71
[58] Field of Search ................................. 363/43, 40, 41, 363/71

[56] References Cited

U.S. PATENT DOCUMENTS

| | | | |
|---|---|---|---|
| 3,832,622 | 8/1974 | Compoly | 321/27 |
| 4,131,936 | 12/1978 | Gemp | 363/43 |
| 4,405,976 | 9/1983 | Mitchell et al. | 363/72 |
| 4,535,399 | 8/1985 | Szepesi | 363/41 |
| 4,733,341 | 3/1988 | Miyazawa | 363/71 |
| 4,779,184 | 10/1988 | White | 363/65 |
| 5,040,105 | 8/1991 | Dhyanchand et al. | 363/43 |
| 5,225,973 | 7/1993 | Patel et al. | 363/43 |

FOREIGN PATENT DOCUMENTS

| | | |
|---|---|---|
| 60-22474 | 2/1985 | Japan . |
| 62-10927 | 1/1987 | Japan . |
| 62-155776 | 7/1987 | Japan . |

*Primary Examiner*—Peter S. Wong
*Assistant Examiner*—Shawn Riley
*Attorney, Agent, or Firm*—Marshall, O'Toole, Gerstein Murray & Borun

[57] ABSTRACT

A stepped waveform inverter and control therefor utilizes the inverter itself as a divide-by-N counter in a phase-locked loop to assure precise control over the output phase and frequency of the inverter.

10 Claims, 5 Drawing Sheets

STEPPED WAVEFORM INVERTER CONTROL

TECHNICAL FIELD

The present invention relates generally to power converters, and more particularly to a control for a stepped waveform inverter.

BACKGROUND ART

Inverters are often used to convert DC power into AC power for one or more AC loads. For example, in a variable-speed, constant-frequency (VSCF) power conversion system, a brushless, synchronous generator converts variable-speed motive power produced by a prime mover into variable-frequency AC power. A rectifier converts the variable-frequency AC power into DC power and an inverter converts the DC power into constant-frequency AC power. The inverter may be of the stepped waveform type that produces three-phase output waveforms each comprising a series of steps or levels. Typically, each phase output waveform is subdivided into six or a multiple of six conduction periods in each cycle of the output, wherein the waveform assumes one of a plurality of constant levels in each conduction period.

Stepped waveform inverters produce output waveforms having harmonics that are more easily filtered than the harmonics produced in a pulse width modulated (PWM) waveform. Thus, the size and weight of a filter coupled to the inverter output may be reduced as compared to a PWM type of inverter.

Often, it is necessary to momentarily or continuously connect the outputs of inverters in parallel to a common load. For example, in an aircraft having multiple VSCF systems connected to a common load bus, it may prove necessary or desirable to transfer the load bus (and the loads connected thereto) from one VSCF system to another. In such a case, a no-break power transfer sequence is effected so that power flow to the loads is not interrupted. Alternatively, it may prove necessary or desirable to connect the VSCF systems in parallel in a continuous fashion so that both supply power to the loads. Recker, et al. U.S. Pat. Nos. 4,937,462 and 4,905,134, assigned to the assignee of the present application, disclose a no-break power transfer control and a paralleling control, respectively, for a PWM inverter in a VSCF system.

Szepesi, U.S. Pat. No. 4,535,399 discloses the use of a phase-locked loop (PLL) for controlling the output of an inverter that supplies AC power to a resonant load.

White, U.S. Pat. No. 4,779,184, assigned to the assignee of the present application, discloses a switched mode power supply having first and second sections wherein a PLL maintains the output of the second section at a precise 180° relationship with respect to the output of the first section.

Compoly, U.S. Pat. No. 3,832,622 discloses phase-locked circuitry for operating a plurality of static inverters in synchronism.

Miyazawa, U.S. Pat. No. 4,733,341 discloses an apparatus for controlling first and second inverters such that the inverters produce outputs that are synchronized to a commercial power supply. Digital phase-locked loop oscillators compare the phase of the inverter outputs with the phase of the commercial power supply and dividers divide the outputs of the digital phase-locked loop oscillators by a variable factor N. The outputs of the dividers are coupled to ring counters that in turn control the inverters.

None of the foregoing patents discloses a control for a stepped waveform inverter, and more particularly a control which regulates the output frequency thereof so that the inverter may be connected momentarily or continuously in parallel with an AC power source.

SUMMARY OF THE INVENTION

In accordance with the present invention, a control for a stepped waveform inverter is simple in design and is capable of accurately regulating the output frequency thereof.

More particularly, a control for an inverter having a plurality of subinverters coupled to inputs of a summing transformer includes a phase comparator having first and second inputs coupled to the summing transformer output and an AC reference source, respectively, and an output at which a phase comparison signal is produced. A compensation unit is coupled to the output of the phase comparator and develops a compensated phase comparison signal. A voltage controlled oscillator (VCO) is coupled to the compensation unit and develops a command signal from the compensated phase comparison signal. Means coupled between the VCO and the subinverters and responsive to the command signal controls the subinverter such that the AC stepped waveform has a desired frequency.

In accordance with a highly preferred embodiment of the present invention, the inverter is connectable in parallel with a further inverter to a power bus and the AC reference source includes a switch having first and second inputs coupled to a master oscillator and the power bus, respectively, and an output wherein the switch is operated to connect the master oscillator to the phase comparator when the inverters are not to be connected in parallel and is operated to connect the power bus to the phase comparator when the inverters are to be connected in parallel. Preferably, the switches are controlled by a control signal developed by a logic circuit. The logic circuit includes means for detecting a synchronized condition during which the phase displacement of an AC stepped waveform produced at the output of the summing transformer is substantially equal to the phase displacement of a power bus waveform produced on the power bus.

Controllable contactors may be coupled between the inverter and the power bus and the logic circuit may include means responsive to the detecting means for closing the contactors when the synchronized condition is detected.

Also in accordance with the preferred embodiment, the compensation unit may comprise a low-pass filter.

In accordance with a further aspect of the present invention, an inverter includes a plurality of subinverters each having controllable switches coupled to three-phase outputs and a summing transformer having a plurality of sets of three-phase primary windings coupled to the three-phase outputs of the subinverters and a set of three-phase secondary windings in which a set of three-phase stepped waveforms are produced. A master oscillator develops an oscillator signal at a certain frequency and a phase comparator includes first and second inputs that receive one of the stepped waveforms and the oscillator signal, respectively, and an output at which a phase comparison signal is produced. A low-pass filter is coupled to the output of the phase comparator and develops a compensated phase comparison signal. A VCO is coupled to the low-pass filter and develops a command signal from the compensated phase comparison signal. Means coupled between the VCO and the switches of the subinverters and responsive to the command signal controls the subinverter such that the set of three-phase stepped waveforms have a frequency equal to the certain frequency.

In accordance with a preferred form of this aspect of the invention, the inverter is connectable in parallel with a further three-phase inverter to a three-phase power bus and the inverter further includes an analog switch having first and second inputs coupled to the master oscillator and the power bus, respectively, and an output. The switch is operated to connect the master oscillator to the phase comparator when the inverters are not to be connected in parallel and is operated to connect the power bus to the phase comparator when the inverters are to be connected in parallel.

Also preferably, the switch is controlled by a control signal developed by a logic circuit having means for detecting a synchronized condition during which the phase displacement of one phase of the set of three-phase stepped waveforms is substantially equal to the phase displacement of a corresponding phase of a power bus waveform appearing on the power bus. A set of three-phase controllable contactors may be coupled between the inverter and the power bus and the logic circuit may include means responsive to the determining means for closing the contactors when the synchronized condition is detected.

In accordance with yet another aspect of the present invention, an inverter includes eight subinverters each having six controllable switches connected in a bridge configuration and coupled to three-phase outputs. A summing transformer is further included having eight sets of three-phase primary windings coupled to the three-phase outputs of the subinverter wherein four of the sets of primary windings are connected in a wye configuration and the remaining sets of primary windings are connected in a delta configuration. The summing transformer further includes a set of three-phase secondary windings in which a set of three-phase 48-step waveforms are produced. The inverter is connectable to a three-phase power bus on which a set of three-phase power bus waveforms are produced by a further inverter at a first phase displacement and frequency. A set of three-phase controllable contactors is coupled between the inverter and the power bus and the contactors are capable of being closed to connect the inverter in parallel with the further three-phase inverter. The master oscillator develops an oscillator signal at a second phase displacement and frequency and an analog switch includes first and second inputs coupled to the master oscillator and the power bus, respectively, and an output. The analog switch is operated to provide the oscillator signal at the analog switch output when the inverters are not to be connected in parallel. Alternatively, the switch is operated to provide one of the power bus waveforms at the analog switch output when the inverters are to be connected in parallel. A phase comparator includes first and second inputs coupled to one of the secondary windings of the summing transformer and the analog switch output, respectively, and an output at which a phase comparison signal is produced. A low-pass filter is coupled to the output of the phase comparator and develops a compensated phase comparison signal and a VCO is coupled to the low-pass filter and develops a command signal from the compensated phase comparison signal. Means coupled between the VCO and the switches of the subinverters and responsive to the command signal controls the subinverter such that one phase of the set of 48-step waveforms has a phase displacement and frequency approaching the phase displacement and frequency of the signal at the analog switch output. A logic circuit includes means for detecting a synchronized condition during which the phase displacement of the one phase of the set of 48-step waveforms is substantially equal to the phase displacement of the signal at the analog switch output and further includes means coupled to the set of controllable contactors for controlling the contactors when the synchronized condition is detected.

DESCRIPTION OF THE PREFERRED EMBODIMENT

Figure 1:
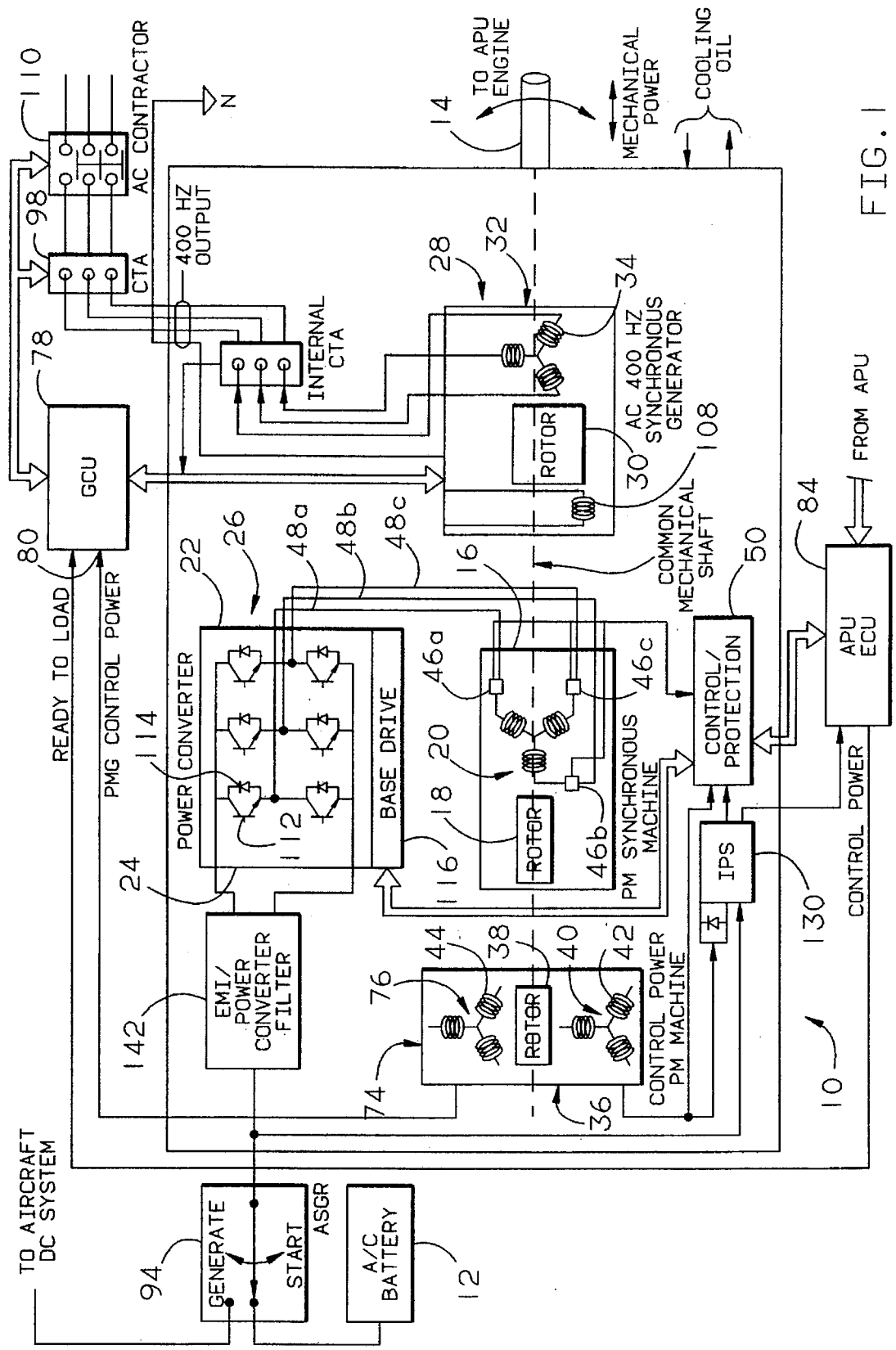
FIG. 1 comprises a simplified block diagram of a power conversion system incorporating a stepped waveform inverter according to the present invention.

Referring now to FIG. 1, a variable-speed, constant-frequency (VSCF) power conversion system converts variable-speed motive power produced by a prime mover 12 into constant-frequency AC power which is supplied via contactors 13a–13c a load bus 14 to one or more AC loads (not shown). Also, an AC power source in the form of an inverter 16 may be connectable to the load bus 14 by controllable contactors 17a–17c. It should be noted that various contactors connecting the inverter 16 to the load bus 14 as well as other contactors are not shown in FIG. 1 for the purpose of simplicity.

The VSCF system includes a brushless, synchronous generator 20 which converts the variable-speed motive power produced by the prime mover 12 into variable-frequency AC power. An AC/DC converter or rectifier 22 converts the variable-frequency power into DC power on a DC link 24 comprising DC link conductors 24a, 24b. The DC power is converted by a DC/AC converter or inverter 26 according to the present invention into three-phase constant-frequency AC power. The constant-frequency AC power may be filtered by an optional filter 28 and supplied to the AC load bus 14 via the contactors 13a–13c.

Figure 2:
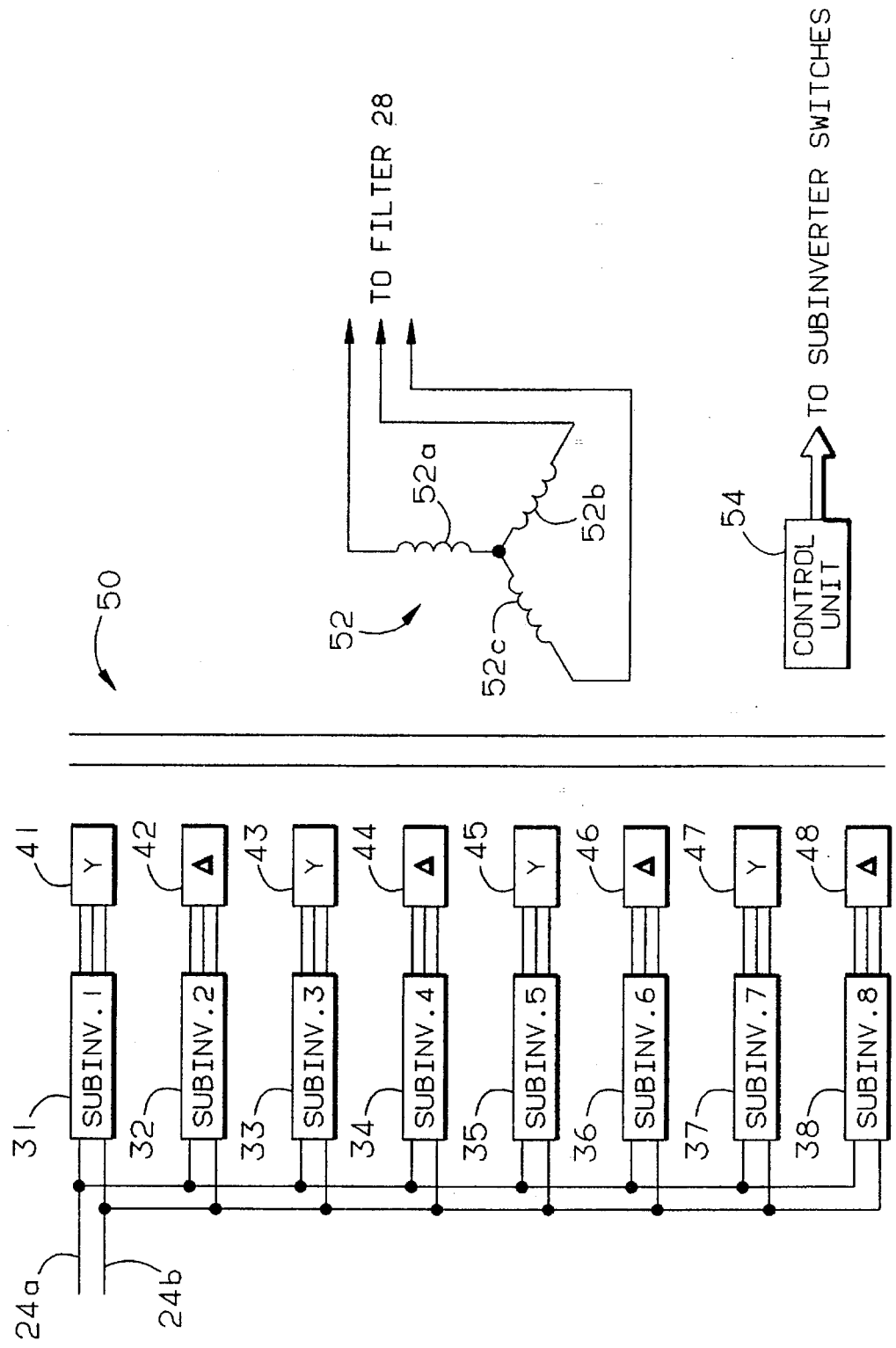
FIG. 2 comprises a simplified combined block and schematic diagram of the stepped waveform inverter of FIG. 1.

Referring now to FIG. 2, the inverter 26 includes first through eighth subinverters 31–38 that are coupled to the DC link conductors 24a, 24b. The subinverters 31–38 are of the three-phase type and develop three-phase outputs that are provided to first through eighth sets of primary windings 41–48 of a summing transformer 50. The windings of each set 41, 43, 45 and 47 are connected together in a wye configuration whereas the windings of each set 42, 44, 46 and 48 are connected together in a delta configuration. The summing transformer 50 further includes a set of three-phase secondary windings 52 comprising phase windings 52a–52c connected together in a wye configuration.

Figure 3:
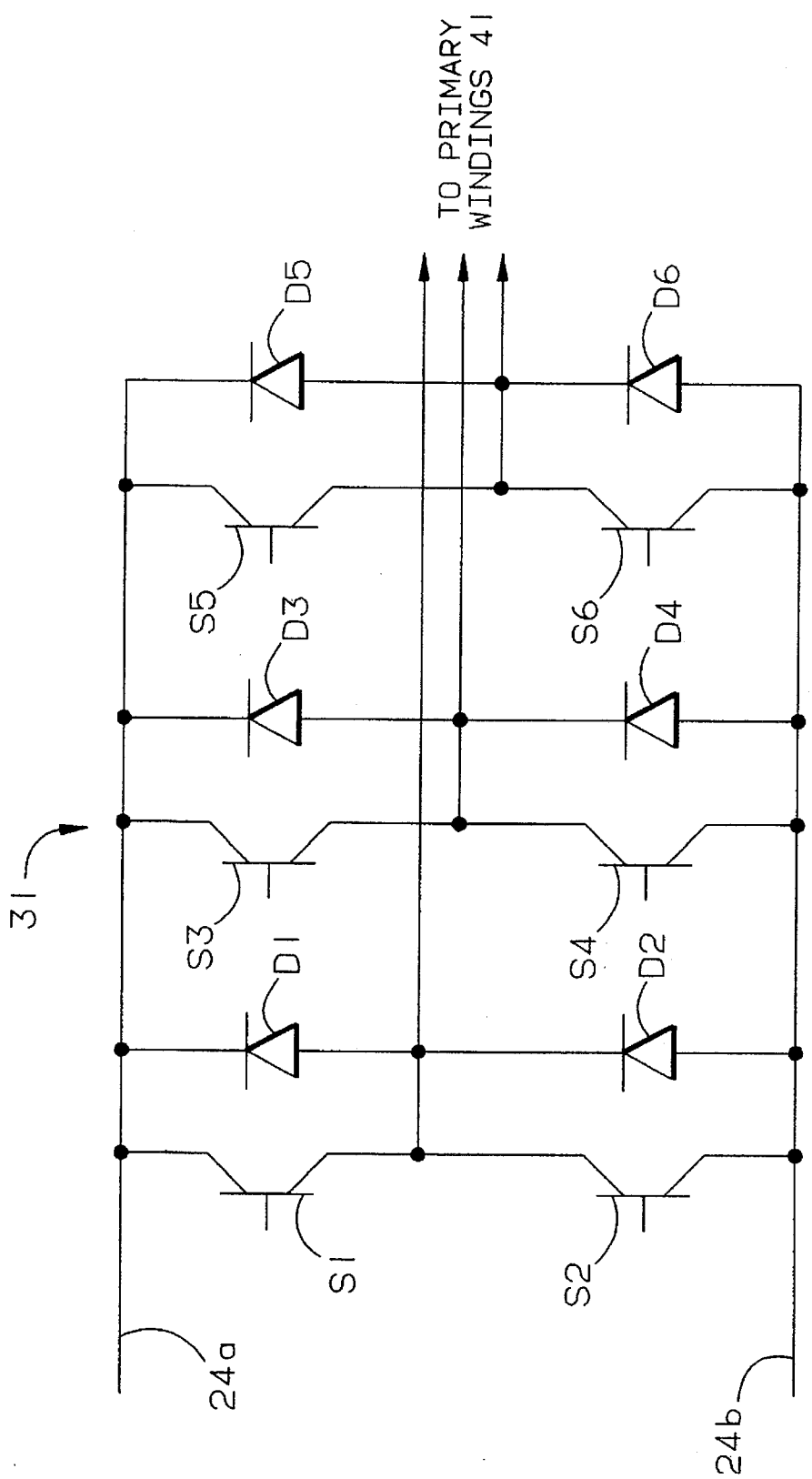
FIG. 3 comprises a simplified schematic diagram of one of the subinverters of FIG. 2.

The subinverters 31–38 are identical, and hence only the subinverter 31 will be described in detail. Referring to FIG. 3, the subinverter 31 includes power switches S1–S6 and associated antiparallel diodes D1–D6 connected together in a conventional three-phase bridge configuration between the DC link conductors 24a, 24b and the set of primary windings 41. Referring again to FIG. 2, the switches S1–S6 as well as the corresponding switches of the subinverters 32–38 are controlled by a control unit 54.

Figure 4:
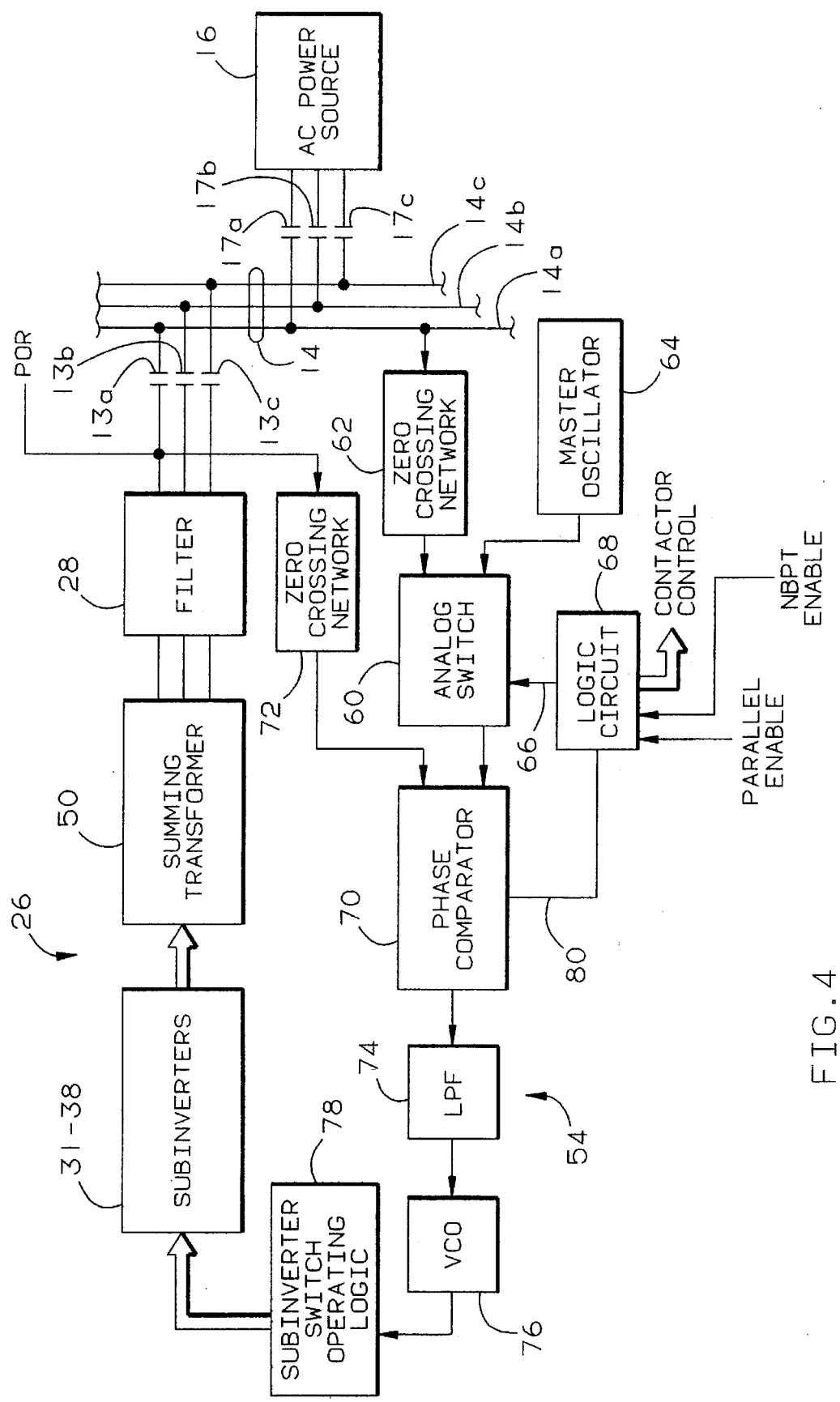
FIG. 4 comprises a block diagram illustrating the design of the control unit 54 in greater detail.

Referring now to FIG. 4, the control unit 54 includes an analog switch 60 having first and second inputs that receive an AC bus synchronization signal developed by a zero crossing network 62 coupled to one of the AC load bus conductors 14a and a signal developed by master oscillator 64, respectively. The analog switch 60 is controlled by a control signal developed on a line 66 by a logic circuit 68 described in greater detail hereinafter. The analog switch 60 is operated by the logic circuit 68 to pass one of the signals developed at the outputs of the zero crossing network 62 and the master oscillator 64 to a first input of a phase comparator 70. A second input of the phase comparator 70 receives a signal developed by a second zero crossing network 72 that in turn is coupled to one of the phase outputs of the filter 28 at a point of regulation (POR).

The phase comparator 70 includes an output coupled to a compensation unit in the form of a low-pass filter 74 that provides a compensated phase comparison signal to a voltage controlled oscillator (VCO) 76. The VCO 76 in turn develops a command signal from the compensated phase comparison signal and provides the command signal to a subinverter switch operating logic circuit 78 that develops 48 switch operating signals for the 48 switches in the subinverters 31–38.

The subinverter switch operating logic circuit 78 may be implemented by the invention disclosed in Dhyanchand et al. U.S. Pat. No. 5,040,105 entitled "Stepped Waveform Inverter With Eight Subinverters," the disclosure of which is hereby incorporated by reference herein. The invention of the '105 patent is shown as being responsive to a clock signal developed by a clock. When the invention of the '105 patent is adapted for use as the circuit 78, the output of the VCO 76 is used as the clock signal rather than the output of a clock.

The logic circuit 68 may be implemented by hardware or may alternatively comprise a processor that executes programming to control the analog switch 60, the contactors 13a–13c and the contactors 17a–17c. As noted in greater detail hereinafter, the logic circuit 68 is responsive to a synchronization signal developed on a line 80 by the phase comparator 70 indicating synchronization of the signals appearing at the first and second inputs thereof. The logic circuit 68 is further responsive to a parallel enable signal indicating that parallel operation of the inverter 26 with the AC power source 16 is to occur and a no-break power transfer (NBPT) enable signal indicating that a no-break power transfer between the inverter 26 and the AC power source 16 is to occur.

Figure 5:
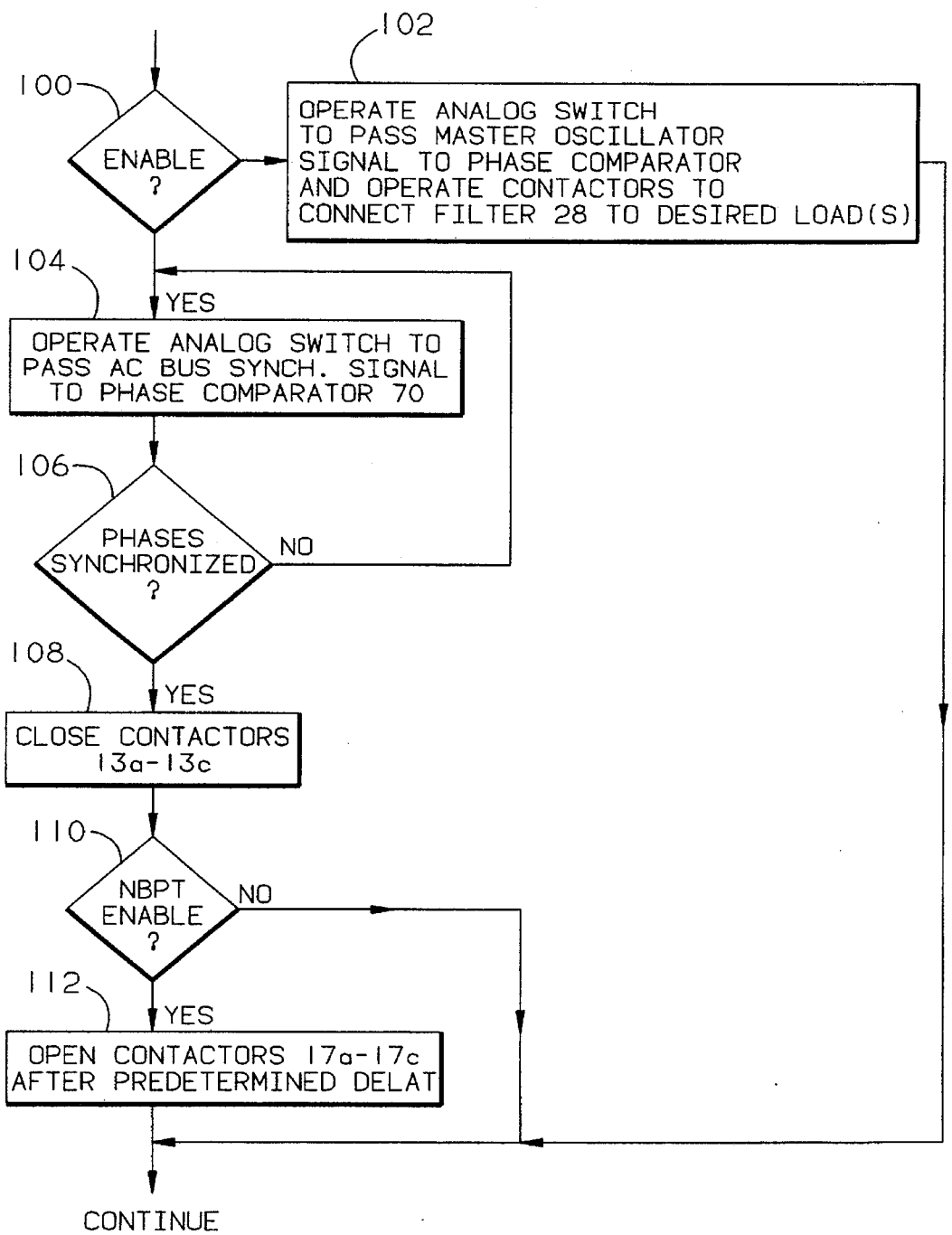
FIG. 5 comprises a flow chart illustrating programming executed by the logic circuit of FIG. 4.

FIG. 5 illustrates programming which may be executed by the logic circuit 68 to effect frequency control of the inverter 26. The programming illustrated in FIG. 5 comprises only a portion of the overall programming executed by the logic circuit 68 and it is merely exemplary in the sense that it could be replaced by alternative programming or hardware that effects the same end result.

The programming of FIG. 5 begins at a block 100 which checks to determine whether either of the parallel enable or NBPT enable signals is in a state commanding either parallel operation or no break power transfer operation. If neither enable signal is in such a state, a block 102 operates the analog switch 60 to pass the master oscillator signal to the phase comparator 70. As a result, the inverter 26 and the filter 28 together with the phase comparator 70, the low-pass filter 74, the VCO 76 and the switch operating logic circuit 78 operate as a phase-locked loop (PLL) which maintains the phase and frequency of the power developed at the POR accurately synchronized to the master oscillator signal. In addition, the block 102 operates the contactors 13a–13c and a set of bus tie breakers (not shown) to connect the output of the filter 28 to one or more AC loads. Also at this time, since the AC power appearing at the POR is not necessarily synchronized with the power developed by the AC power source 16, the contactors 13a–13c and the bus tie breakers are operated to disconnect the inverter 26 from the power source 16 to prevent real and reactive power flow therebetween.

Following the block 102, control passes to other portions of the programming executed by the logic circuit 68.

If the block 100 determines that one of the enable signals is in a state commanding parallel or NBPT operation, then a block 104 operates the analog switch to pass the AC bus synchronization signal developed by the zero crossing network 62 to the phase comparator 70. This action in turn causes the phase comparator, the low-pass filter 70, the VCO 76, the logic circuit 78, the inverter 26 and the filter 28 to operate as a PLL so that the phase and frequency of the power at the POR approach the phase and frequency of the power on the load bus 14. A block 106 then checks to determine whether the signals at the first and second inputs of the phase comparator 70 are synchronized. If not, control remains in the loop comprising the blocks 104, 106 until such phase synchronization is detected. When this occurs, the phase and frequency of the power at the POR is precisely matched to the phase and frequency to the power on the load bus 14. A block 108 then closes the contactors 13a–13c and a block 110 checks to determine whether the NBPT enable signal is in the state commanding NBPT operation. If so, the contactors 17a–17c are opened after a predetermined delay period to complete the no break power transfer sequence and control passes to the remaining portions of the programming executed by the logic circuit 68.

If the block 110 determines that the NBPT enable signal is not in the state commanding NBPT operation, then it has been determined that parallel operation has been commanded and the block 112 is skipped. The inverter 26 and the AC power source 16 thereafter continuously provide power in parallel to the load bus 14 until either or both of the contactor sets 13a–13c and 17a–17c is subsequently opened by the programming executed by the logic circuit 68.

From the foregoing, it can be seen that the inverter of the present invention is precisely synchronizable to either an external reference supplied by a master oscillator or to a reference supplied by a second AC power source. In either case, the inverter 26 operates as a divide-by-N counter as part of a PLL circuit to obtain excellent controllability and stability in the inverter output.

In addition to the foregoing, the control takes into account phase shifts introduced by the filter and feeders between the filter and the POR, and hence real and reactive power flow between the inverter 26 and the AC power source 16 is minimized.

The control and inverter of the present invention do not require a memory for storing switch control waveforms for the subinverter switches. The control is thus less expensive and of simpler design.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A control for an inverter having a plurality of subinverters coupled to inputs of a summing transformer wherein the summing transformer includes an output at which an AC stepped waveform is produced, comprising:

a phase comparator having first and second inputs coupled to the summing transformer output and an AC reference source, respectively, and an output at which a phase comparison signal is produced;

a compensation unit coupled to the output of the phase comparator and developing a compensated phase comparison signal;

a voltage controlled oscillator (VCO) coupled to the compensation unit developing a command signal from the compensated phase comparison signal;

means coupled between the VCO and the subinverters and responsive to the command signal for controlling the subinverters such that the AC stepped waveform has a desired frequency; and wherein the inverter is connectable in parallel with a further inverter to a power bus wherein the AC reference source includes a switch having first and second inputs coupled to a master oscillator and the power bus, respectively, and an output wherein the switch is operated to connect the master oscillator to the phase comparator when the inverters are not to be connected in parallel and is operated to connect the power bus to the phase comparator when the inverters are to be connected in parallel.

2. The control of claim 1, wherein the switch is controlled by a control signal developed by a logic circuit.

3. The control of claim 2, wherein the AC stepped waveform and a power bus waveform on the power bus each have a phase displacement and wherein the logic circuit includes means for detecting a synchronized condition during which the phase displacement of the AC stepped waveform is substantially equal to the phase displacement of the power bus waveform.

4. The control of claim 3, wherein controllable contactor are coupled between the inverter and the power bus and wherein the logic circuit includes means responsive to the detecting means for closing the contractors when the synchronized condition is detected.

5. The control of claim 1, wherein the compensation unit comprises a low-pass filter.

6. An inverter, comprising:

a plurality of subinverters each having controllable switches coupled to there-phase outputs;

a summing transformer having a plurality of sets of three-phase primary windings coupled to the three-phase outputs of the subinverters and a set of three-phase secondary windings in which a set of three-phase stepped waveforms are produced;

a master oscillator developing an oscillator signal at a certain frequency;

a phase comparator having first and second inputs receiving one of the stepped waveforms and the oscillator signal, respectively, and an output at which a phase comparison signal is produced;

a low-pass filter coupled to the output of the phase comparator and developing a compensated phase comparison signal;

a voltage controlled oscillator (VCO) coupled to the low-pass filter developing a command signal from the compensated phase comparison signal; and, means coupled between the VCO and the switches of the subinverters and responsive to the command signal for controlling the subinverters such that the three-phase AC stepped waveform has a frequency equal to the certain frequency; and wherein the inverter is connectable in parallel with a further three-phase inverter to a three-phase power bus and further including an analog switch having first and second inputs coupled to the master oscillator and the power bus, respectively, and an output wherein the switch is operated to connect the master oscillator to the phase comparator when the inverters are not to be connected in parallel and is operated to connect the power bus to the phase comparator when the inverters are to be connected in parallel.

7. The control of claim 6, wherein the switch is controlled by a control signal developed by a logic circuit.

8. The control of claim 7, wherein each phase of the AC stepped waveform and each phase of a power bus waveform on the power bus has a phase displacement and wherein the logic circuit includes means for detecting a synchronized condition during which the phase displacement of one phase of the set of three-phase stepped waveforms is substantially equal to the phase displacement of the corresponding phase of the power bus waveform.

9. The control of claim 7, wherein a set of three-phase controllable contactors are coupled between the inverter and the power bus and wherein the logic circuit includes means responsive to the determining means for closing the contactors when the synchronized condition is detected.

10. An inverter, comprising:

eight subinverters each having six controllable switches connected in a bridge configuration and coupled to three-phase outputs;

a summing transformer having eight sets of three-phase primary windings coupled to the three-phase outputs of the subinverters wherein four of the sets of primary windings are connected in a wye configuration and the remaining sets of primary windings are connected in a delta configuration and wherein the summing transformer further includes a set of three-phase secondary windings in which a set of three-phase 48-step waveforms are produced;

wherein the inverter is connectable to a three-phase power bus on which a set of three-phase power bus waveforms is produced by a further inverter at a first phase displacement and frequency;

a set of three-phase controllable contactors coupled between the inverter and the power bus and capable of being closed to connect the inverter in parallel with the further three-phase inverter;

a master oscillator developing an oscillator signal at a second phase displacement and frequency;

an analog switch having first and second inputs coupled to the master oscillator and the power bus, respectively, and an output wherein the analog switch is operated to provide the oscillator signal at the analog switch output when the inverters are not to be connected in parallel and is operated to provide one of the power bus waveforms at the analog switch output when the inverters are to be connected in parallel;

a phase comparator having first and second inputs coupled to one of the secondary windings of the summing transformer and the analog switch output, respectively, and an output at which a phase comparison signal is produced;

a low-pass filter coupled to the output of the phase comparator and developing a compensated phase comparison signal;

a voltage controlled oscillator (VCO) coupled to the low-pass filter developing a command signal from the compensated phase comparison signal;

means coupled between the VCO and the switches of the subinverters and responsive to the command signal for controlling the subinverters such that one phase of the set of 48-step waveforms has a phase displacement and frequency approaching the phase displacement and frequency of the signal at the analog switch output; and a logic circuit including means for detecting a synchronized condition during which the phase displacement of the one phase of the set of 48-step waveforms is substantially equal to the phase displacement of the signal at the analog switch output and means coupled to the set of controllable contactors for closing the contactors when the synchronized condition is detected.

* * * * *